(12) United States Patent
Wacker

(10) Patent No.: US 6,209,939 B1
(45) Date of Patent: Apr. 3, 2001

(54) ON-SITE MEDIA TRAILER

(76) Inventor: Michael K. Wacker, 917 Second St., #301, Santa Monica, CA (US) 90403

(*) Notice: Subject to any disclaimer, the term of this patent is extended or adjusted under 35 U.S.C. 154(b) by 0 days.

(21) Appl. No.: 09/268,912

(22) Filed: Mar. 15, 1999

Related U.S. Application Data

(60) Provisional application No. 60/078,093, filed on Mar. 16, 1998.

(51) Int. Cl.$^7$ ........................................... B60P 3/00
(52) U.S. Cl. .................. 296/24.1; 296/181; 296/26.13
(58) Field of Search .................. 296/26.12, 181, 296/26.13, 24.1

(56) References Cited

U.S. PATENT DOCUMENTS

| | | | |
|---|---|---|---|
| 1,543,892 | 6/1925 | Willard . | |
| 4,001,949 | 1/1977 | Francis | 35/10 |
| 4,171,114 | 10/1979 | Marden | 244/116 |
| 4,526,548 | 7/1985 | Livingston | 434/226 |
| 4,555,167 | 11/1985 | Roland | 352/133 |
| 4,666,204 * | 5/1987 | Reinholtz | 296/24.1 |
| 4,922,721 | 5/1990 | Robertson et al. | 62/3.61 |
| 4,964,671 * | 10/1990 | Millar | 296/24.1 X |
| 5,316,480 | 5/1994 | Ellsworth | 434/29 |
| 5,519,410 | 5/1996 | Smalanskas et al. | 345/7 |
| 5,553,281 | 9/1996 | Brown et al. | 395/600 |
| 5,592,469 | 1/1997 | Szabo | 370/342 |
| 5,600,364 | 2/1997 | Hendricks et al. | 348/1 |
| 5,633,891 | 5/1997 | Rebec et al. | 375/219 |
| 5,659,350 | 8/1997 | Hendricks et al. | 348/6 |
| 5,671,008 | 9/1997 | Linn | 348/97 |
| 5,706,616 * | 1/1998 | Fernandez | 296/24.1 X |
| 5,897,158 * | 4/1999 | Henke et al. | 296/24.1 X |
| 6,098,346 * | 8/2000 | Miller et al. | 296/24.1 X |

* cited by examiner

Primary Examiner—Dennis H. Pedder
Assistant Examiner—Jason Morrow
(74) Attorney, Agent, or Firm—Andrew S. Jordan, Esq.; Cislo & Thomas, LLP

(57) ABSTRACT

A media or recorded event editing and screening trailer provides portable means by which editing and screening equipment can be brought on-site or otherwise to provide greater efficiency and less delay in processing film or other media. A large trailer such as that used in tractor/trailer rigs provides the basis for a combined facility incorporating a projection room, a screening area, several editing consoles, a refreshment area, an equipment area, a foyer, and an editing area. Slideouts provide increased interior volume space for greater working comfort yet are sturdy and stable both in their deployed and collapsed conditions. For travel, the slideouts slide into the interior of the trailer in order to provide a minimal exterior displacement conforming with interstate highway regulations, and/or the like. Doors with stairs descending and making transition to the ground are provided on each side of the trailer. Satellite or other wireless transmission communications processing equipment can accompany the digital or other editing equipment held securely within the confines of the trailer. A generator or the like generating power at approximately 20–25 kilowatts with a 50-gallon fuel reservoir allows the on-site media trailer of the present invention to attain some self-sufficiency. Alternative embodiments of the present invention include a container-like shell with removable wheels or the like, making the trailer more modular and transportable.

33 Claims, 6 Drawing Sheets

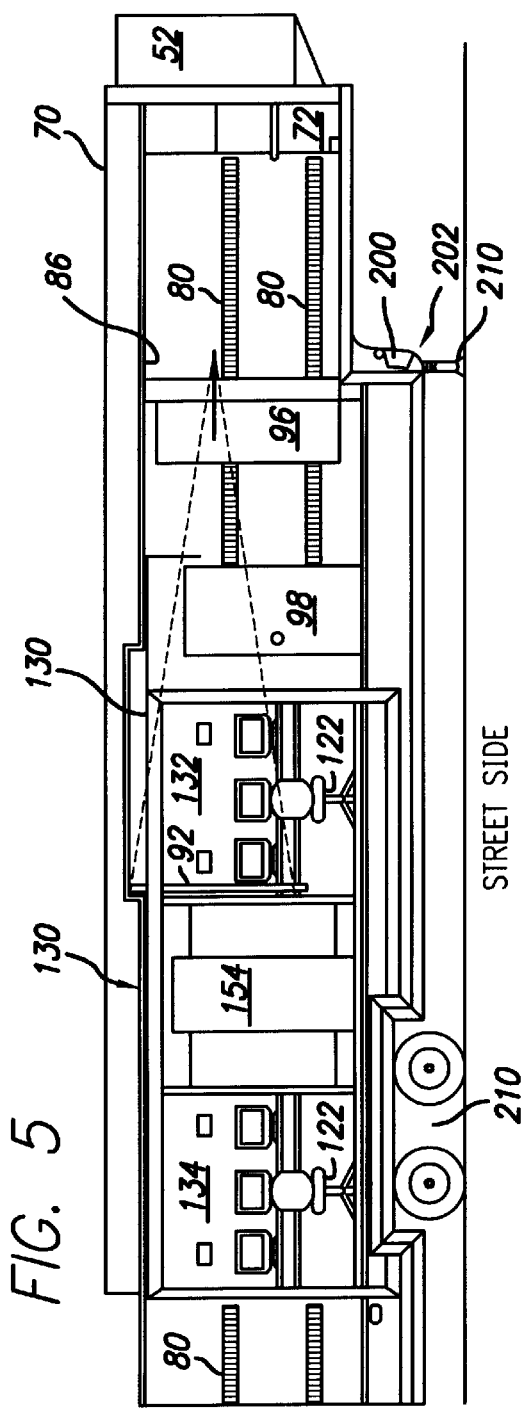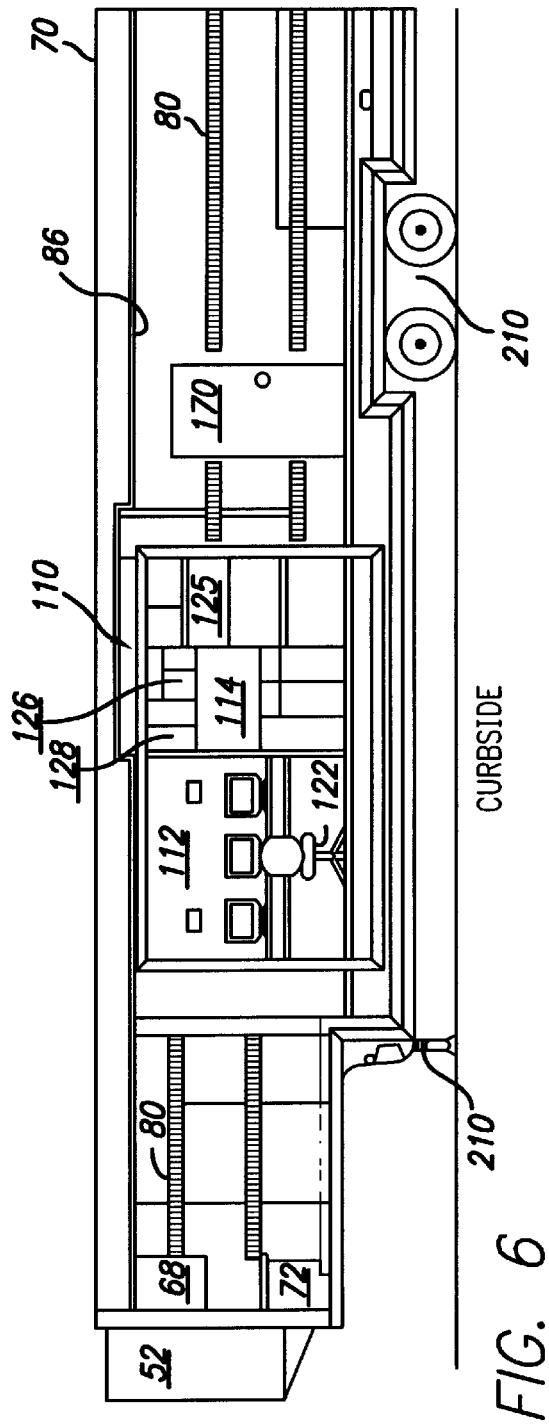

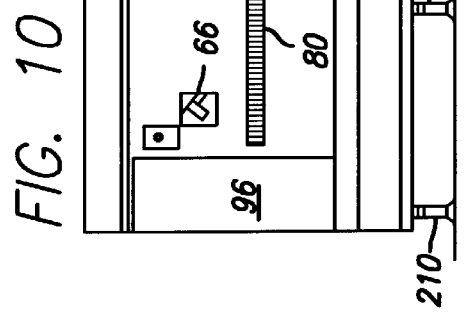
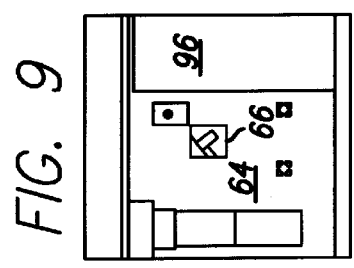
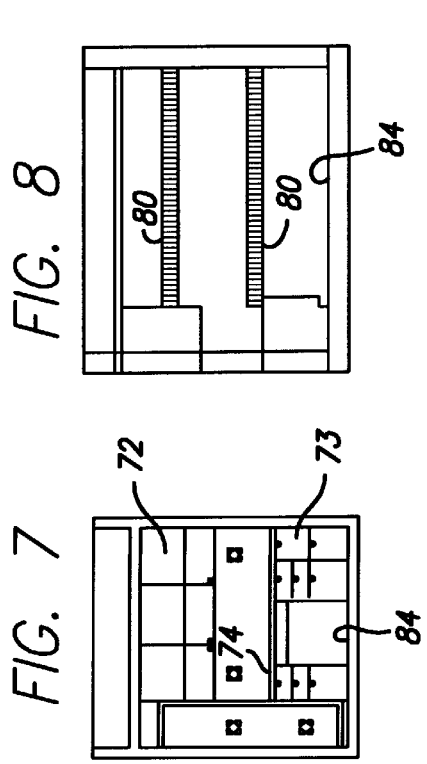
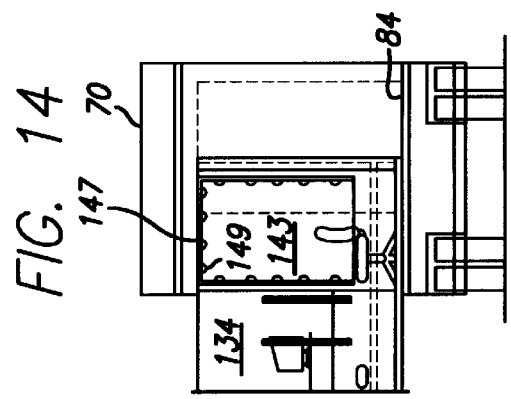
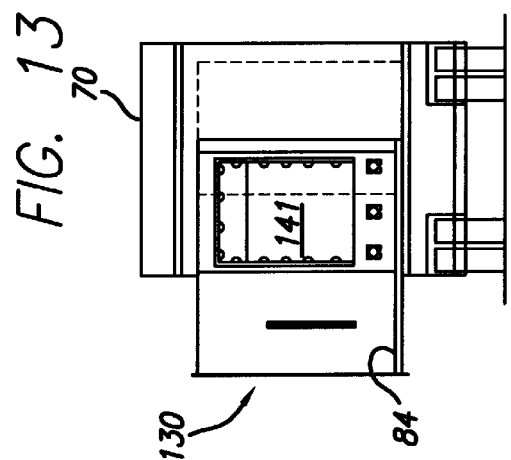
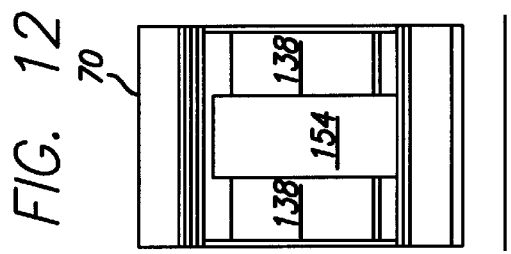
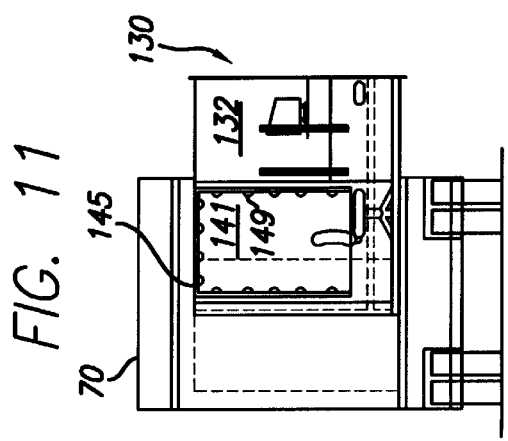

ON-SITE MEDIA TRAILER

CROSS-REFERENCES TO RELATED APPLICATIONS

Relationship is declared to U.S. Provisional Application No. 60/078,093 filed Mar. 16, 1998, which is incorporated herein by this reference thereto.

BACKGROUND OF THE INVENTION

1. Field of the Invention

This invention relates to portable and transportable media editing facilities and more particularly to a trailer specifically configured for editing and reviewing film or other visual media in close proximity to the location where such film is shot.

2. Description of the Related Art

Recently, the entertainment industry has seen increased growth and activity in conjunction with the development of modern electronic communications and electronic signal processing. It is increasingly becoming a feasible option to travel anywhere in the world in order to provide a proper setting for the action to take place in a movie. However, the facilities by which raw or unedited film or other recordings can be edited in the field have not kept up with the pace of the technology. Very often, the daily rushes or "dailies" must be shipped to a special facility where they can be viewed and edited. This slows down the creative process, increases costs, and prevents the artists involved from taking advantage of spontaneous circumstances that could be turned advantageously to their favor. Such facilities may be far from the location shoot. Certain environmental or weather conditions that may occur on an unpredictable or intermittent basis might advantageously be incorporated into a movie or film if it were known just how the recording of the event should be properly presented to an audience for best impact or artistic expression.

With the rise of electronic signal processing technology, digital editing of film has become an increasingly attractive and available means by which film can be edited. The equipment used to perform such digital editing is expensive and delicate in that it should not be subject to extreme weather conditions, undue jarring or jostling, or the like. In fact, such electronic signal processing machinery might best respond to a highly controlled environment. Consequently, it becomes a high risk and possibly expensive endeavor to locate digital or other editing equipment out in the field where it might be subject to the extremes of weather that sometimes occur on location and/or traumas inflicted in transport. Repair and maintenance of such complex electronic and mechanical machinery is best done in specialized repair facilities and not out in the field. Consequently, it becomes more difficult to gauge and control the impact of recorded media when the editing facilities must be kept apart from the location where the film is shot. The prior art has generally not addressed this problem, although transport facilities, editing machinery, and communications equipment are known in the art.

It would be of some advantage to the entertainment industry to have available portable and extensive editing facilities so that the film or other media which is recorded may be quickly and easily edited in an environmentally secure facility that provides comfortable means by which expensive editing sessions can be pursued as well as secure means by which expensive and possibly delicate equipment can be safely transported over long distances and into rough country.

SUMMARY OF THE INVENTION

The present invention provides portable means by which full editing and screening facilities can be provided on-site or on location for movie, film, or other recorded audio-visual media. A large trailer, such as those used in tractor/trailer rigs, provides an outer shell to protect the expensive and sophisticated editing equipment inside. In order to expand the interior volume available for editing and maneuvering space, one or more slidable sections (or slideouts) are provided on the sides of the trailer. The slideouts provide means by which the trailer may conform to interstate or other highway standards for height, width, and length while providing a sufficient and possibly an ample volume of space within which several editing stations or similar types of facilities can be provided. Movement within the confines of the expanded trailer interior are facilitated as the quarters are less cramped, making it easier to endure and constructively participate in extended editing, screening, or similar sessions.

Powered by a diesel generator or the like, the present invention includes a projection room allows screening of films and other audio-visual materials in an adjacent screening area of the on-site media trailer of the present invention. Storage space may be provided in the projection room and a small door may provide access between the projection room and the screening area. A partition may complete the separation of the projection room from the screening area with a clear optical plate providing optical access to the screening area from the projection room. A first, curbside slide-out area provides an editing workstation as well as a small commissary area with a refrigerator, microwave, and coffeepot. On the other side of the screening area, a door provides ingress and egress by means of a stair step with handrail. The images projected from the projection room are projected on a fold-up screen or the like and may be controlled from a console present in the screening area.

A second, streetside slideout extends from a forward portion of the screening area back towards the rear of the trailer. The streetside slideout is approximately one-third larger than the curbside slideout and has two editing consoles on either side of a central equipment area. Sliding out and away from the main trailer section, the second streetside slideout provides space through which passage may be made from the screening area to the rear editing area. The rear editing area has the second editing console of the second streetside slideout as well as a KEM film editing table or station.

In one embodiment, there are three (3) editorial workstations built into the trailer slideouts accommodate non-linear editing equipment and/or KEM stations. These workstations can be adjusted horizontally and vertically to the editor's needs.

The passageway between the screening area and rear editing area may also have a door to the outside which is accessed by stair steps with a handrail. An additional rear double door may provide a large opening through which the rear of the trailer may be accessed as by a ramp attached to the trailer frame.

The on-site media trailer of the present invention may be permanently or removably attached to a trailer bed or chassis to effect rolling transport. Alternatively, the present invention may be configured to accommodate known and standardized cargo forms such as those used in ocean-going cargo vessels or railroad piggyback services. By providing a modular, portable, and expandable media trailer, editing and production services can be located adjacent or close to almost any movie shoot location. In one embodiment, the present invention may also be configured for helicopter transport.

Beyond the mere provision of editing and screening facilities, sophisticated and state-of-the-art electronic communications and electronic signal processing equipment may be incorporated or associated with the equipment area of the second streetside slideout portion. Included with such equipment may be digital editors such as those known in the art as made by AVID and LIGHTWORKS, as well as VCRs, signal processors, telephony, and satellite communications equipment. A satellite dish or other wireless transmitting and receiving antenna may be installed in a collapsible manner on the roof of the trailer. Under appropriate circumstances, broadband digital signal transmission capable of transmitting several minutes to several hours of digitized audio visual material may be transmitted from the on-site media trailer of the present invention back to studios in southern California or elsewhere by satellite or otherwise.

By providing the on-site media trailer of the present invention, productions of recorded audio-visual works are less limited by the location of editing and screening facilities.

OBJECTS OF THE INVENTION

It is an object of the present invention to provide a media trailer which can be used on-site or on location.

It is an additional object of the present invention to provide such an on-site media trailer that is transportable into areas where recorded audio-visual sequences are shot and recorded.

It is an additional object of the present invention to provide a secure and environmentally-controlled environment for the safe transport and use of sophisticated and complex electronic editing equipment.

It is an additional embodiment of the present invention to provide an on-site media trailer that provides sufficient workspace in order to facilitate the editing, screening, and creative processes.

It is yet another object of the present invention to provide an on-site media trailer that takes advantage of the current state-of-the-art electronics signal processing yet allows future modification as the art of such information transmission reception progresses.

It is yet another object of the present invention to provide a self-contained on-site media trailer that communicate by wireless transmission via satellite or otherwise.

These and other objects of and advantages of the present invention will be apparent from a review of the following specification and accompanying drawings.

BRIEF DESCRIPTION OF THE DRAWINGS

FIG. 5 is a side-cross-sectional view taken along line 5—5 of FIG. 4.

FIG. 6 is a side cross-sectional view of the interior of the on-site media trailer of the present invention taken along line 6—6 of FIG. 4.

FIG. 7 is a forward elevational view of the front portion of the on-site media trailer of the present invention taken along line 7—7 of FIG. 4.

FIG. 8 is a side interior view taken along the front portion of the on-site media trailer of the present invention taken along line 8—8 of FIG. 4.

FIG. 9 is a rearward-facing sectional view of the front portion of the on-site media trailer of the present invention taken along line 9—9 of FIG. 4.

FIG. 10 is a front-facing sectional view of the on-site media trailer of the present invention taken along line 10—10 of FIG. 4.

FIG. 11 is a rearward-facing sectional view of the on-site media trailer of the present invention taken along line 11—11 of FIG. 4.

FIG. 12 is a side-facing sectional view of the on-site media trailer of the present invention taken along line 12—12 of FIG. 4.

FIG. 13 is a front-facing sectional view of the on-site media trailer of the present invention taken along line 13—13 of FIG. 4.

FIG. 14 is a front-facing sectional view of the on-site media trailer of the present invention taken along line 14—14 of FIG. 4.

DESCRIPTION OF THE PREFERRED EMBODIMENT(S)

Figure 1:
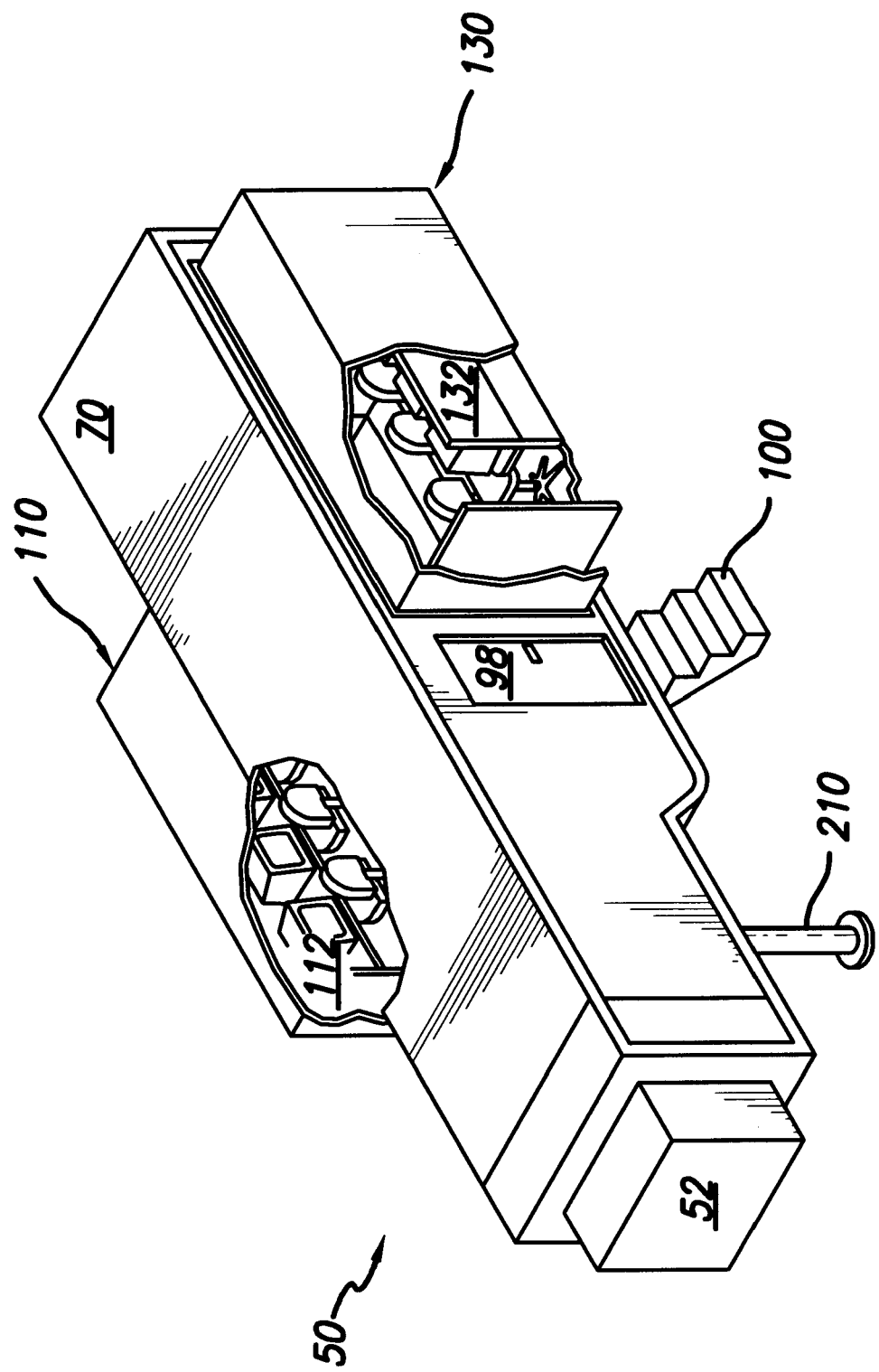
FIG. 1 is a top left and partially cutaway view of one embodiment of the on-site media trailer of the present invention.

The detailed description set forth below in connection with the appended drawings is intended as a description of presently preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

As shown in FIGS. 1–14, the on-site media trailer of the present invention is generally conformed along those lines of a standard trailer for a tractor-trailer rig known to travel upon American interstate highways. However, additional embodiments and constructions of the present invention are achievable for trailer rigs used in other countries. In all embodiments, the on-site media trailer of the present invention should conform to local vehicle laws with respect to such trailers. Additional embodiments exist with regards to conforming the present invention to modular or other cargo containers and the like. Slideouts may or may not be present in such models.

The on-site media trailer 50 of the present invention is generally a self-contained screening and editing facility that takes the place of a dedicated editing room of a major motion picture studio or independent editing facility. State-of-the-art editing and screening facilities are present so that film editing and review can take place in almost any available location. With decreased lag time between film shooting and the editing and screening process, increased efficiencies are provided to those cinematic graphic artists operating in the field while helping to keep costs lower due to less dead time spent waiting for the film to be developed, edited, and screened at a distant facility.

Powering the on-site media trailer 50 of the present invention is a generator 52 located at the front portion 54 of the trailer 50. The generator 50 may supply twenty (20) kilowatts of electrical energy and incorporate a fifty (50) gallon fuel tank for extended operation. The generator 50 may be housed generally outside the confines of the interior 56 of the trailer 50 in order to reduce interior noise and provide better ventilation for exhaust. Power lines running into the interior 56 of the trailer 50 may extend from the generator as appropriate or required. For all cables, lines, and transmission paths, hidden or covered runways may be used in order to provide protection for such electric power or electronic signal lines.

As shown in FIGS. 4, 5, 6, and 9, the projection area 60 is rearwardly adjacent to the generator 52 and provides an area in which audio visual projection may be made of films, videotape, or the like for screening. Central to the projection area 60 is a projector 62. The projector 62 projects images into the screening area through a projector room partition 64 having an optical glass window 66 directly in front of the projector 62. The optical glass window 66 allows images projected by the projector 62 to be transmitted into the interior of the screening area.

An office workstation 71 may have an equipment rack 68 on the trailer shell 70 adjacent to generator 52. Overhead cabinets 72 provide storage area adjacent the equipment rack 68. As shown in FIG. 7, a desk or other station 74 may make use of the space below the overhead cabinet 72 and provide an area for files, a fax, and cellular telephones. The storage for such a fax may include a separate unit with a removable wire platform for paper handling. Additionally, a plurality of cellular phones may be stored in such an independent unit 73 adjacent to desk 74.

As shown in FIGS. 4–9, there are several attachment means available throughout the on-site media trailer 50 of the present invention by which cargo, equipment, and the like may be secured within the confines of the trailer 50.

Figure 4:
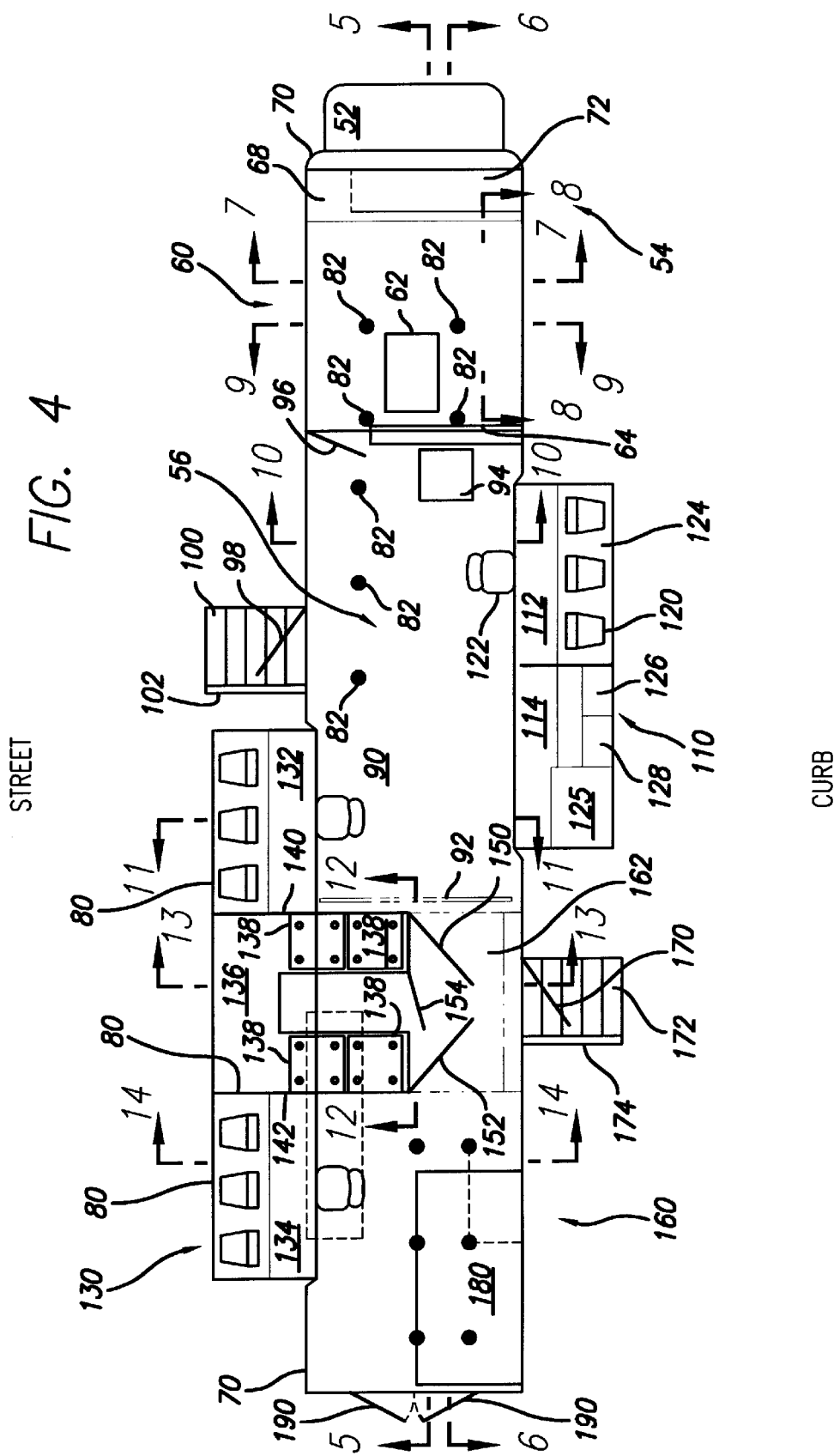
FIG. 4 is a top plan view of floor layout of the on-site media trailer of the present invention.

An airline wall track, or A-track, 80 provides means by which such items can be secured to the interior walls of the trailer 50. Additionally, D-rings 82 as shown in FIG. 4 may be installed on the floor 84 of the trailer 50 and elsewhere so as to provide securement of cargo, equipment, and like items to the floor of the trailer to the floor 84 of the trailer 50. With the safe securement of cargo, equipment, and the like, the media trailer 50 of the present invention can transport needed items when not in use, which allows the media trailer 50 to serve a dual purpose.

Both A-track 80 and D-rings 82 may be located as required and needed throughout the interior 56 of the trailer 50. Additionally, like securing means may provide additional bracing and securement for cargo, equipment, and the like. The ceiling 86 of the on-site media trailer 50 may also provide securement means. However, in one embodiment, the ceiling may be acoustically insulated or otherwise treated to damp noise and may require a more fragile structure than is sufficient to bear the weight of lashed cargo, equipment, or the like.

The projector 62 transmits its images into the projection area 90 where such images can be viewed on a fold-up screen 92. The fold-up screen 92 folds away or rolls away for easy storage and transport. The projection area 90 is generally sufficiently spacious to allow several people to simultaneously view the images projected by the projector 62. In one embodiment, fifteen (15) to twenty (20) people may be accommodated in the screening/projection area 90. Additionally, a sound system (not shown) or the like may be associated with the projector 62 so that the audio portion of the audio-visual work may be perceived and scrutinized in conjunction with the video portion. Overhead projectors and other visual systems may provide additional media viewing means.

A control console 94 is coupled or linked to the projector 62 and the sound system in order to control all pertinent parameters thereof such that closer scrutiny and inspection can be made of the audio-visual work being screened. A door 96 can control passage between the projection area 60 and the screening area 90. The door 96 also serves to acoustically isolate the screening area 90 from the projection area 60. A door 98 to the outside may swing outwardly from the confines of the projection area 90 and mediate any height difference between the ground and the floor 84 of the trailer by a series of steps 100 having a handrail or the like 102.

Figure 2:
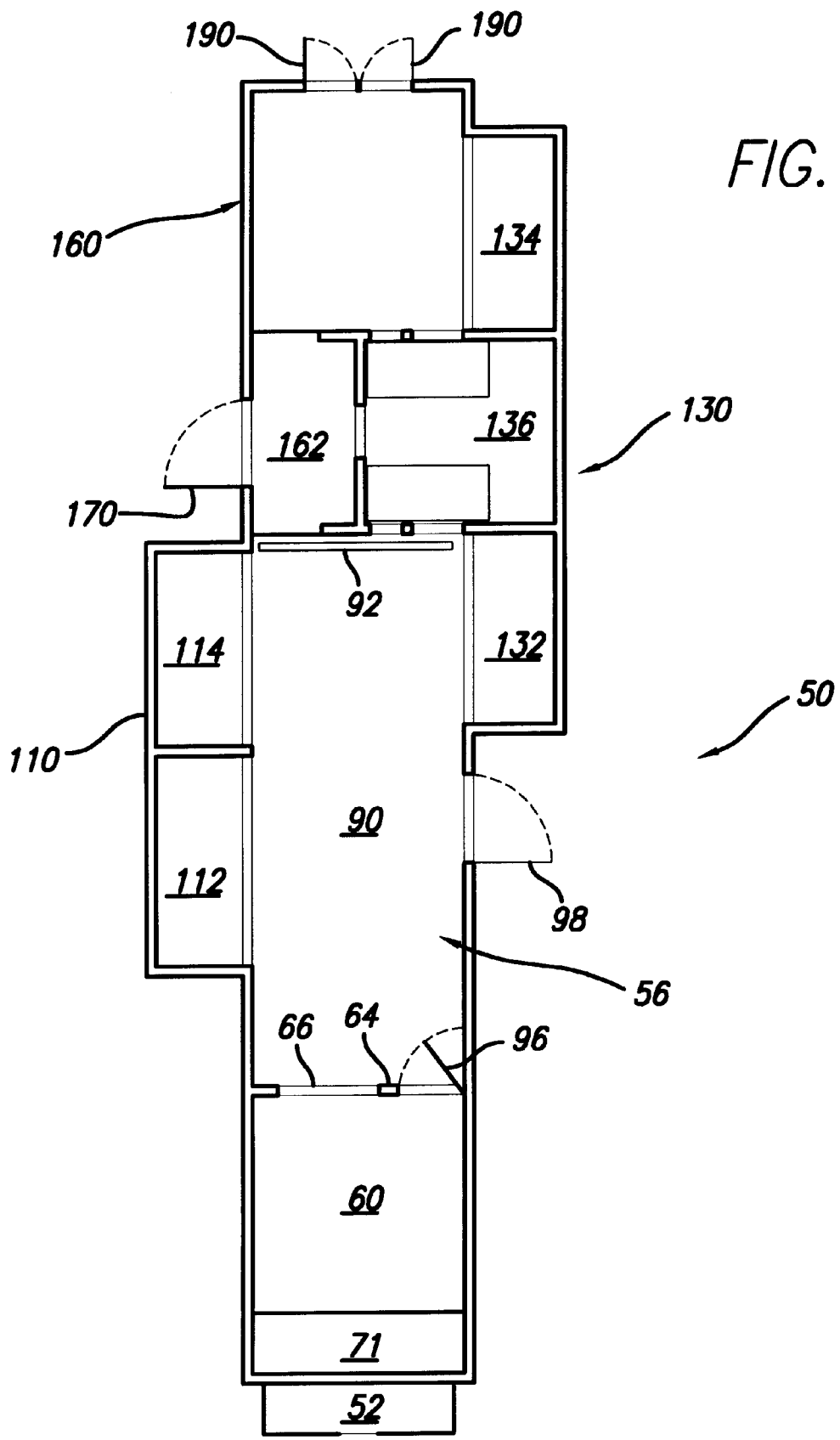
FIG. 2 is a top cross-sectional view of the on-site media trailer shown in FIG. 1.
Figure 3:
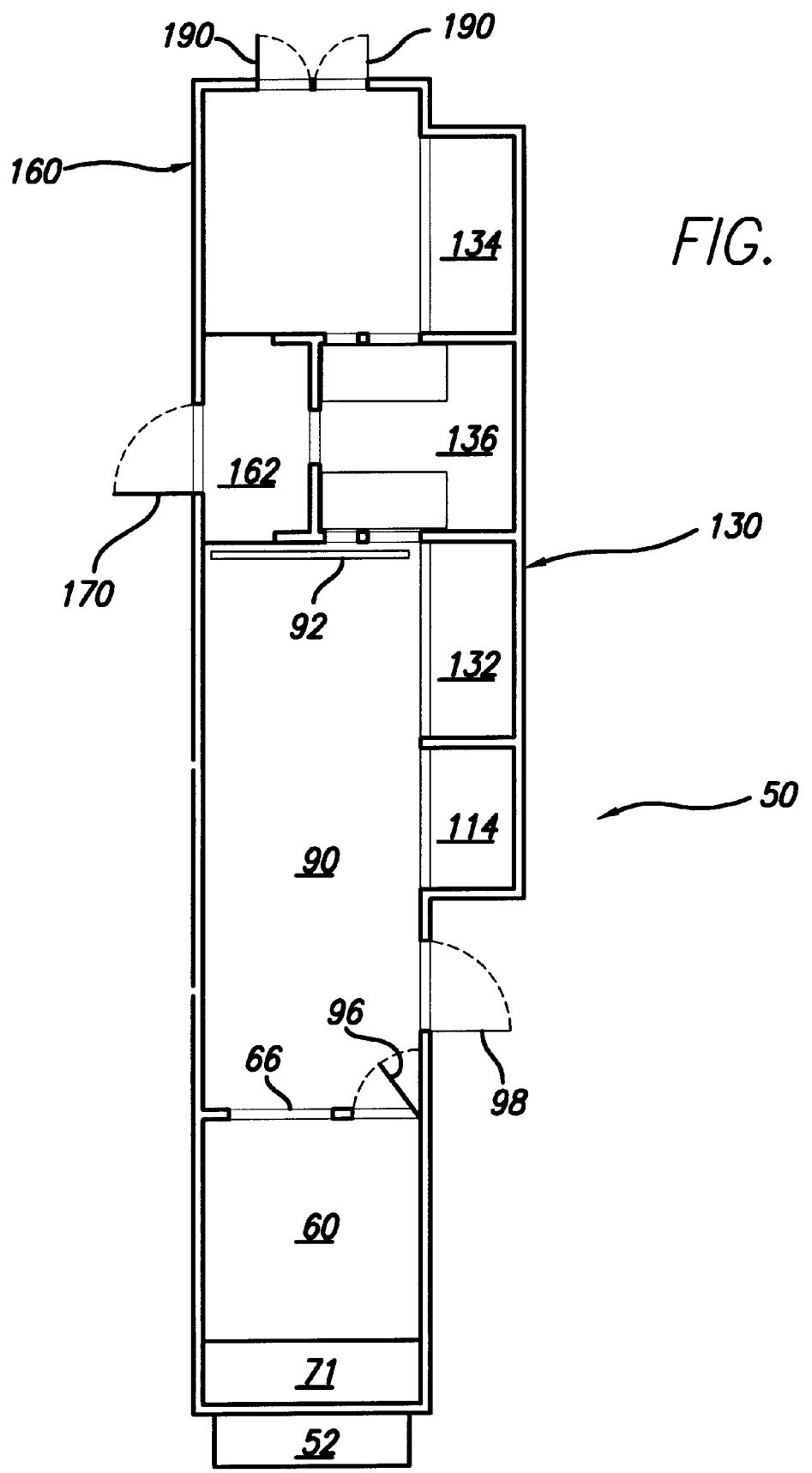
FIG. 3 is a top cross-sectional view of an alternative embodiment of the on-site media trailer of FIG. 1 having only a single slideout.

As shown in FIGS. 2, 4, and 6, a smaller or curbside slideout 110 extends outwardly from the screening area 90 and provides a first editing console or workstation 112 and a small commissary, pantry or refreshment area 114. The slideout 110 is generally rectangularly prismatic in shape having an open interior side to provide accommodation for the console area 112 and refreshment area 114. Seals about the perimeter of the slideout area serve to protect the interior 56 of the trailer 50 from outside elements. Slidable means such as bearings or the like serve to allow the street side slideout 110 slidable engagement with the remaining portion of the on-site media trailer 50. The first street side slideout may be pulled out of or pushed into the interior 56 of the trailer 50 by hand, crank, electric, hydraulic, or other means.

The construction of the first curbside slideout may be generally the same as that for the trailer 50 as a whole and supports similar to those used to support the trailer 50 may be used to shore up the cantilever portion of the first curbside slideout 110. However, one embodiment of the present invention contemplates and provides for no support for the curbside slideout 110. Sufficient means by which the curbside slideout 110 are provided in conjunction with the main body portion of the media trailer 50. Flanges (not shown) present about the perimeter of the curbside slideout 110 may press against the perimeter of the opening through which the curbside slideout 110 slides. This abutment may be one of several ways in which the curbside slideout 110 is self-supporting. Additionally, and as shown by example in FIGS. 11, 13, and 14, some overlap may be retained so that the slideout 110 is supported between upper, lower, and even side overlaps between the slideout 110 and the main trailer portion. Several additional cubic feet of space are afforded to the interior 56 of the trailer 50 by the first curbside slideout 110.

The first editing console 112 may have a bank of three (3) monitors 120 that provide visual means by which film or other visual media may be edited. Control means (not shown) used to control the monitors 120 and other related editing processes may be used in conjunction with the editing console 112. As shown in FIG. 6, the secretary's chair or the like 122, preferably on wheels, provides means by which easy inspection of the monitor bank 120 may be achieved. An adjustable counter or the like 124 may provide support for the monitor bank 120 or any of the individual monitors.

The commissary/refreshment area may include a large (19.7 cubic foot) refrigerator 125, a coffeemaker 126, and/or a microwave 128.

When fitted into the confines of the interior 56 of the trailer 50, the first curbside slideout 110 generally fits flush along the exterior sides of the trailer 50. Consequently, no protruding projection by the first curbside slideout 110 serves to interfere with the roadway travel of the media trailer 50 of the present invention.

Offset from and generally to the rear of the first curbside slideout 110 is a second streetside slideout 130. The streetside positioning of the second streetside slideout 130 may allow more room for the slideout 130 to outwardly extend. The second streetside slideout 130 provides protection for the projection/screening area steps 100. In contrast, the shorter length of the first curbside slideout 110 takes up less space on the protected curb side of the trailer 50 and provides more room about which people could congregate such as under an awning or the like so that staff meetings, instruction sessions and/or discussions can take place.

The second streetside slideout 130 has a pair of editing consoles 132 and 134 that face outwardly on opposite sides of an equipment area 136. The editing consoles 132, 134 may be similar to or identical with that of the first editing console 112. All three may be hooked up by signal lines or conduits to the equipment 138 and equipment area 136 and it may be possible that the several consoles can work simultaneously on the same creative work in order to provide real time access and editing by two or more parties. The second streetside slideout 130 may be constructed in a manner similar to that of the first curbside slideout 110.

Partitions 140, 142 serve to divide the second and third editing consoles 132, 134 from the equipment area 136. Partition 140, separating the second console area 132 from the equipment area 136, may terminate in a door 150 while partition 142, separating the third console 134 from the equipment area 136, may terminate in a second door 152. When the second streetside slideout 130 is extended out and away from the interior 56 of the trailer 50, the two doors 150, 152 may define a passageway between the screening area 90 and the rear portion of the trailer. A third door 154 may provide access to the equipment area 136 and serve in conjunction with the first and second doors 150, 152 to secure the equipment area 136 away from generally traveled areas.

Equipment racks or the like may be used to hold, secure, and protect equipment associated with the on-site media trailer 50 of the present invention. Alternatively, the first and second doors 150, 152 may generally be held shut to isolate the rear portion of the trailer 160 from the passageway 162 when the second streetside slideout 130 is extended. FIG. 12 shows a cutaway view facing the equipment area door 154 while FIG. 13 shows a side view of the equipment area 136. As can be seen from inspection of the drawings, FIGS. 11 and 14 are generally mirror images of one another as they are facing portions on either side of the equipment area 136.

FIGS. 11, 13, and 14 all show open side-panel apertures 141, 143 opening into the equipment area. The open equipment apertures 141, 143 may be circumscribed, or be otherwise associated with corresponding aluminum frames 145, 147. The aluminum frames may have tabs 149 for the attachment of equipment, equipment racks, or otherwise. Such tabs 149 may be arranged in a standard configuration or in one complying with specifications delivered from the owner or designer.

Similar to the projection area door 98, an equipment area door 170 allowing access to the outside is opposite that of the equipment area door 154. Stairs or the like 172 similar to those used adjacent the screening area 100 may allow easy transition from the ground to the trailer particularly in conjunction with the handrail 174.

The rear portion of the trailer 160 not only has the third editing console 134 but also a KEM editing table 180 or the like. Film may be edited, cut, spliced at the KEM station 180 and serves to complement the electronic facilities incorporated by the present invention 50. Such KEM equipment is generally standard in editing facilities. As technology progresses, the KEM editing table 180 may be replaced by equipment defining a newer standard.

Rear doors or the like 190 provide wide access to the interior 56 and other confines of the rear portion 160 of the trailer 50. A ramp or the like (not shown) can provide access for dollies, hand trucks, and the like by which equipment may be quickly and easily moved into or out of the trailer 50 of the present invention.

Alternative embodiments of the present invention exist based upon the fundamental aspects and characteristics of the media trailer 50. In particular, the media trailer 50 of the present invention may have removable or detachable wheels so that the media trailer 50 can become a detachable portion of rolling stock or otherwise. By providing removable wheels, the media trailer 50 can be piggybacked on a railroad flatbed car or the like in order to transport it overland in a lower profile manner. The wheels could be stored inside the media trailer 50 for attachment upon reaching the movie shoot location or other destination.

Additionally, a cargo container or the like such as those used for overseas shipping may have slideouts in conform to the operating principles of the media trailer 50. Such cargo container could have editorial workstations, screening and projection rooms, electronic equipment storage area, and a main editing suite much like the present invention. One advantage to a cargo container embodiment to the present invention is its modular form and the ability to conform the exterior profile of the container to the requirements for overseas shipping or the like. Such a cargo container embodiment to the present invention would also be susceptible to helicopter transport as by SKY-CRANE, slinged helicopter cargo, or the like. For example, the SIKORSKY S-64 SKY-CRANE has a payload of approximately 42,000 lbs. The empty weight of the media trailer 50 of the present invention is approximately 32,000 lbs., and with some margin of safety, an additional 5,000 lbs. of equipment could be transported inside the media trailer 50 of the present invention by helicopter. The same basic components can be present in a cargo container or the like suitable for helicraft transport as is true for the media trailer 50 itself. Consequently, the form of the media trailer 50 of the present invention is not necessarily as important as its function. By providing means local to film shoots and the like, significant expenses and delays are avoided while achieving better artistic and production control.

Having set forth in general various components and elements of the present invention 50, certain particulars of a preferred embodiment are set forth by which a better general understanding of the present invention 50 may be achieved.

The length of the trailer 50 of the present invention may be approximately 48 feet and have an outside width of approximately 102 inches. The overall height of the trailer 50 may be 12 feet 10 inches with an inside floor height of 36.5 inches. An internal drop of 9 inches may be present with a deck length of 11 feet. The king pin setting may be 36 inches, there being an upper coupler height of 48 inches.

The exterior side panels of the trailer 50 of the present invention may be 0.050-inch riveted aluminum painted on one side. The wheel well trim may also be painted with both the aluminum side panels and rear wall trim to be painted in Mercedes Bright Silver in color. Graphics can be supplied to adorn the sides of the trailer 50 of the present invention according to client or customer preferences. In one embodiment, the siding is smooth and may be generally drab in appearance to diminish any attraction of attention. Backup lights may be present on the order of two or more. The trailer front may be polished stainless steel as may be the generator box. In one embodiment, the polished stainless steel box housing the generator may be 32 inches in depth, 64 inches in width, and 86 inches in height having doors with paddle latches that may be locked.

The side posts of the present invention 50 may be 12-gauge galvanized hat posts. The roof may be 0.040-inch one-piece aluminum. Underlying the floor in a storage or cargo area may be a series of five (5) belly boxes having double sealed doors to protect and seal the contents from the outside environment, particularly while traveling in wet and muddy places. The trailer 50 of the present invention may have a 25,000 GAVW air ride suspension in conjunction with eight (8) 7.5 inch by 17.5 inch aluminum wheels. Tires known in the art as MICHELIN 275/70R17.5 may be twice doubled up on each side to provide eight (8) wheels upon which the trailer may carry its weight in conjunction with a tractor.

A straight style closed tandem axle setting may be used having a length of 37 feet from the king pin to the center of the rear axle. An automatic slack adjuster may be present as may be an emergency spring brake.

Landing gear used to support the trailer 50 when stationary may comprise dual hydraulic landing gear with stainless steel drop enclosures in conjunction with a storage compartment. As shown in FIG. 5, a battery 200 may be present in a compartment 202 to provide direct current electricity to trailer 50 of the present invention. The landing gear 210 should be sufficient to support the weight of the trailer with people moving about inside of it. Similar supports may be used for the slideout portions 110, 130 in order to provide additional support for them. Alternatively, the cantilever nature of the slideouts 110, 130 may allow them to derive their support from the trailer 50 itself so long as sufficient support is provided.

Seven (7) top and seven (7) bottom rail marker lights may be present on each side of the trailer 50. Brake lights may be set three (3) per side and used in conjunction with conspicuity tape attached per U.S. Department of Transportation (USDOT) requirements. Standard license plate lights may be used and side turn signal lights may be centered on the length of the trailer 50 with one (1) on each side. Full air brakes may provide stopping power for the on-site media trailer 50.

Extruded aluminum or other similar material may be used for the top and bottom rail with cross members made as follows: 4-inch heavy duty extruded aluminum, 3-inch steel tubing in the sub-frame area, and 4-inch high beams in the king pin area. The curbside access door 92 and the street side access door 98 are preferably each made of 36-inch wide heavy-duty double sealed door with steps. In an alternative embodiment, the street side access door 98 may be a 36-inch wide double sealed camper door.

The slideouts 110, 130 may be 21 feet 6 inches long for the streetside slideout 130 and 14 feet 4 inches long for the curbside slideout 110.

For the interior of the on-site media trailer 50, the walls may be lined and insulated in order to provide a better visual and acoustic area. Screening or viewing rooms may be lined and/or carpeted with gray headliner carpet. All the equipment and editing rooms may also be lined and/or carpeted with gray headliner carpet. The projection room ceiling may be finished with a black T-bar suspended ceiling system with gray fissured acoustical 2 inch×2 inch tiles. The screening or viewing room, as well as the editing room, may be also be finished with a black T-bar suspended ceiling system with gray fissured acoustical 2 inch×2 inch tiles.

The equipment area 136 itself may also have ceiling finishes similar to those for the projection, screening, and editing areas. Two recessed halogen fixtures may be fixed on each of the street and curb sides of the on-site media trailer 50. A single halogen fixture may be fixed at the rear of the trailer 50. However, this single light may be accompanied by more light fixtures to provide more illumination. The rear trailer wall should be solid with two (2) access doors associated with a 60-inch wide detachable ramp. The ramp may slide under or be somehow otherwise associated with the trailer 50 so as to provide easy access to the ramp. A broom sweep or other mud flap or dust deterrent device may be placed behind the rear wheels of the trailer 50. Electrical outlets may be distributed within the interior 56 of the trailer 50 as necessary or required.

Four (4) air conditioning units may be ducted throughout the trailer with a zoned thermostat controlling individual air conditioning levels in different parts of the trailer 50. Four (4) 5.5-pound hand held HALOTRON portable fire extinguishers may provide fire suppression and control should fire break out within the confines of the trailer 50 or adjacent thereto.

Raceways used for cables and/or wires may be 4-inch× 4-inch aluminum "J"-shaped conduit cable raceways above the ceiling and below the floor. In a preferred embodiment, two (2) such raceways are present both above the ceiling and below the floor running the full length of the trailer. Punch outs or other access devices or panels may allow access to the cabling held in the raceways. Ethernet, co-axial, or other signal transmission cable runs may be disposed in side walls and installed in flexible conduit.

In conjunction with the equipment 138 held in the equipment area 136 or otherwise, uninterrupted power supply (UPS) units may be provided to ensure a constant power supply during fluctuations thereof. In a preferred embodiment, three (3) UPS units are provided such as those manufactured by American Power Conversions such as model #SU2200RM which is a 2200/1600 VA/Watt 8/27 full/half load run time UPS being rack mountable and having a height of approximately 19 inches. Commercial-cut pile SAXONY carpet may provide a floor covering for the interior 56 of the trailer 50. Airline wall track 80 may be present throughout the interior 56 of the trailer 50, as may D-rings 82 as mentioned above.

Recessed incandescent downlights as made by HALO or otherwise may provide interior lighting to the trailer. Such lighting may be controlled with a dimmer, 12-volt fluorescent ceiling mounted lights are present within the trailer 50. Seating may be provided by secretary chairs here above or otherwise. All cabinetry may have laminated tops and bases per the customer preference who may provide the laminate for the microwave oven, coffee maker, and refrigerator.

Included amongst the various types of audio-visual equipment that can be incorporated into the on-site media trailer 50 of the present invention are: a projection screen mounted to a 1-inch×1-inch mat black aluminum frame ninety (90) inches in width by seventy-five (75) inches in height with mounting brackets to mount to the wall of the screening room 90 at the slideout 130. An overhead video projector, BOSE brand surround sound system, various consumer electronics and audio-visual equipment, overhead projectors, telephone switching systems, telephones, computers, monitors, film projectors, KEM station, remote control system, 12-inch×12-inch optical glass for the projection room partition 64, equipment area 136 electronics racks, various power and signal cables, and the like. Additionally, kickplates may be provided as needed throughout the on-site media trailer 50 in order to provide protection for the equipment area structures adjacent the floor 84 of the trailer 50.

The equipment 138 may provide telecommunications, wireless, and/or other communications interfaces for data transfer via electronic signal means. Electronic information handled by such equipment may be that as is known and developed in the art, including digitized film sequences with accompanying digitized audio, email, and the like. Satellite, wireless, telephonic or other communications means may provide wide bandwidth means for transmitting and receiving such information via the equipment 138.

A 25-kilowatt KOHLER diesel generator with a 50-gallon fuel tank runs for approximately fifty (50) hours and supplies the media trailer 50 with electrical power. The diesel generator is housed in a sound-dampened enclosure to reduce noise. Additional electrical connections may arise from a 100 Amp shoreline, having Camlock connectors and adapters. As mentioned above, UPS units for uninterrupted power supply may be present for each of the three (3) editorial workstations.

Four (4) CRUISE-AIRE climate control units may provide air conditioning and heating with individual thermostats controlling temperature zones within the confines of the media trailer 50. Additional insulation may surround the confines of the media trailer 50 in order to provide acoustic and thermal insulation for the occupants and equipment inside the media trailer 50.

Four (4) Halon fire extinguishers complement the three (3) emergency exits in case a fire should break out within the media trailer 50. Emergency lighting is present throughout the media trailer 50 so that egress may be quickly made should the power fail and an emergency arise.

In one embodiment, the six (6) incoming hard or cellular phone lines may be present in the media trailer 50. These phone lines may be complemented by twelve (12) extension phones. A 10Base-T Ethernet system may be used to network the non-linear editing workstations. Satellite video conferencing via a satellite dish and appropriate transmission and equipment, as well as ISDN, T-1, or other high-speed communication lines may be installed or coupled to the media trailer 50 of the present invention.

With respect to the film projection system, two (2) Simplex Interlock 35 mm film projectors may be subject to remote control by a custom or load controller or the remote control console 94. INCO lenses for flat or scope pictures may be used as well as ORC 1600 watt Xenon lamps. Optical and magnetic changeover may be present as well as a CERWIN VEGA speaker and a power rewind. As an alternative embodiment, a VISTAVISION projector may be made available and installed upon request.

With respect to the audio-visual equipment contemplated as being included with the media trailer 50 of the present invention, a SHARP XG-E3000 U-Video projector, as well as a Sony DSS-System may be used. A DAYTRON Antenna with automatic signal search may also be included. Additional equipment includes: a 13-inch color monitor, a DVD playback unit, a DOLBY Pro-Logic tuner/amplifier, a BOSE SurroundSystem, SVHS playback and recording unit, as well as an audio cassette playback and recording unit. As mentioned above, the office workstation has sufficient room for the necessary paperwork accompanying film shoots, and may include a printer, fax, and photocopier.

The screen may be a DA-LITE screen, 7½ feet×5 feet on a rigid frame. As mentioned above, the kitchenette or pantry area 114 may be outfitted with a full-size refrigerator, microwave, and coffeemaker, cabinets, drawers, and work space. In some embodiments of the present invention, a sink with a water tap may be included if a sufficient and appropriate water supply is available.

In one embodiment, the first curbside slideout 110 may extend outwardly 34 inches and be approximately 16 feet long while the second street side slideout 130 may extend outwardly 34 inches and be approximately 24 feet long. Other alternative dimensions of the media trailer 50 (and its container or modular alternative embodiments) and like structures may enjoy construction with plans of different required dimensions. However, the form or the dimensions of the present invention are not so important as its actual ability to provide on-site editing, projection, and screening facilities in a modular, transportable, and expandable/collapsible fashion.

While the present invention has been described with regards to particular embodiments, it is recognized that additional variations of the present invention may be devised without departing from the inventive concept.

What is claimed is:

1. A self-contained portable and transportable facility for editing and screening audio-visual and related media on location, the facility comprising:

a shell, said shell providing an enclosed space for editing and screening activities;

an editing facility housed within said shell, said editing facility providing editing capability capable of editing audio-visual media; and a screening facility housed within said shell, said screening facility providing screening capability capable of screening audio-visual media edited by said editing facility; whereby editing and screening of audio-visual media can be performed on location in conjunction with the generation and recording of such audio-visual media to enhance and optimize the realization of audio-visual media production in a more timely fashion.

2. The editing and screening facility of claim 1, wherein said shell further comprises:

a first slideout, said first slideout slidably engaging said shell;

said first slideout expanding enclosed space within the editing and screening facility when said first slideout is extended from said shell; and said first slideout generally conforming to an exterior of said shell when said first slideout is withdrawn into said shell; whereby expanded interior confines may be provided for the editing and screening facility by said first slideout when said first slideout is deployed, said first slideout providing a more streamlined exterior for the editing and screening facility when said first slideout is retracted.

3. The editing and screening facility of claim 2, wherein said first slideout further comprises said editing facility.

4. The editing and screening facility of claim 2, wherein said first slideout extends from and retracts into said screening facility.

5. The editing and screening facility of claim 2, wherein said first slideout further comprises:

a commissary or refreshment area, said commissary area generally adjacent to said editing facility.

6. The editing and screening facility of claim 2, wherein said editing facility further comprises:

a KEM station.

7. The editing and screening facility of claim 1, further comprising:

a projection facility housed within said shell, said projection facility transmitting audio and/or visual works into said screening facility, said projection facility separate from said screening facility to reduce noise in said screening facility.

8. The editing and screening facility of claim 7, wherein said projection facility is remotely controlled by said screening facility.

9. The editing and screening facility of claim 1, further comprising:

an information signal processing facility housed within said shell, said information signal processing facility coupled to said editing facility; whereby signals representing recorded media can be edited by and stored upon said information signal processing facility, commands for such editing and storage initiated from said editing facility.

10. The editing and screening facility of claim 2, wherein said shell further comprises:

a second slideout, said second slideout slidably engaging said shell on a side of said shell opposite that of said first slideout;

said second slideout expanding enclosed space within the editing and screening facility when said second slideout is extended from said shell; and said second slideout generally conforming to an exterior of said shell when said second slideout is withdrawn into said shell; whereby expanded interior confines may be provided for the editing and screening facility by said second slideout when said second slideout is deployed, said second slideout providing a more streamlined exterior for the editing and screening facility when said second slideout is retracted.

11. The editing and screening facility of claim 10, wherein said second slideout further comprises said editing facility.

12. The editing and screening facility of claim 10, wherein said second slideout extends from and retracts into said screening facility.

13. The editing and screening facility of claim 12, wherein said second slideout further comprises:

an information signal processing facility housed within said shell, said information signal processing facility coupled to said editing facility; whereby signals representing recorded media can be edited by and stored upon said information signal processing facility, commands for such editing and storage initiated from said editing facility.

14. The editing and screening facility of claim 10, wherein said second slideout further comprises:

a first part of said editing facility on a first side of said slideout;

a second part of said editing facility on a second side of said slideout; and an information signal processing facility positioned between said first and second editing facility parts, said information signal processing facility coupled to said editing facility; whereby said second slideout provides additional room for said editing facility when said second slideout is extended and signals representing recorded media can be edited by and stored upon said information signal processing facility, commands for such editing and storage initiated from said editing facility.

15. The editing and screening facility of claim 14, wherein said second slideout defines a passageway between said screening facility and a rear portion of the editing and screening facility when second slideout is extended.

16. An editing and screening facility for editing and screening audio-visual and related media on location, the editing and screening facility comprising:

a shell, said shell providing an enclosed space for editing and screening activities;

an editing facility housed within said shell, said editing facility providing editing capability capable of editing audio-visual media, said editing facility including a KEM station and an information signal processing facility for processing, editing, and storing signals representing recorded media;

a screening facility housed within said shell, said screening facility providing screening capability capable of screening audio-visual media edited by said editing facility;

a projection facility housed within said shell, said projection facility transmitting audio and/or visual works into said screening facility, said projection facility separate from said screening facility to reduce noise in said screening facility, said projection facility remotely controllable from said screening facility;

a first slideout, said first slideout slidably engaging said shell, said first slideout expanding enclosed space within the media when said first slideout is extended from said shell, said first slideout generally conforming to an exterior of said shell when said first slideout is withdrawn into said shell, said first slideout extending from and retracting into said screening facility, said first slideout including a commissary or refreshment area, said commissary area generally adjacent to a first part of said editing facility;

a second slideout, said second slideout slidably engaging said shell on a side of said shell opposite that of said first slideout, said second slideout expanding enclosed space within the editing and screening facility when said second slideout is extended from said shell, said second slideout generally conforming to an exterior of said shell when said second slideout is withdrawn into said shell, a second part of said editing facility on a first side of said slideout and a third part of said editing facility on a second side of said slideout, said information signal processing facility positioned between said second and third editing facility parts, second slideout defining a passageway between said screening facility and a rear portion of the editing and screening facility when said second slideout is extended; and a communications facility for providing communications between said information signal processing facility and a receiver of information signals used by said information signal processing facility; whereby editing, screening, and communications capability are made available in a transportable form that can generally be moved into close proximity to locations where audio, visual, and/or audio-visual media are recorded, making production of such media more contemporaneous with the recording thereof.

17. A media trailer for editing and screening audio-visual and related media on location, said media trailer comprising:
   a trailer shell, said trailer shell providing an enclosed space for editing and screening activities;
   an editing facility housed within said trailer shell, said editing facility providing editing capability capable of editing audio-visual media; and
   a screening facility housed within said trailer shell, said screening facility providing screening capability capable of screening audio-visual media edited by said editing facility; whereby
   editing and screening of audio-visual media can be performed on location in conjunction with the generation and recording of such audio-visual media to enhance and optimize the realization of audio-visual media production in a more timely fashion.

18. The media trailer of claim 17, wherein said trailer shell further comprises:
   a first slideout, said first slideout slidably engaging said trailer shell;
   said first slideout expanding enclosed space within the media trailer when said first slideout is extended from said trailer shell; and
   said first slideout generally conforming to an exterior of said trailer shell when said first slideout is withdrawn into said trailer shell; whereby
   expanded interior confines may be provided for the media trailer by said first slideout when said first slideout is deployed, said first slideout providing a more streamlined exterior for the media trailer when said first slideout is retracted.

19. The media trailer of claim 18, wherein said first slideout further comprises said editing facility.

20. The media trailer of claim 18, wherein said first slideout extends from and retracts into said screening facility.

21. The media trailer of claim 18, wherein said first slideout further comprises:
   a commissary or refreshment area, said commissary area generally adjacent to said editing facility.

22. The media trailer of claim 18, wherein said editing facility further comprises:
   a KEM station.

23. The media trailer of claim 17, further comprising:
   a projection facility housed within said trailer shell, said projection facility transmitting audio and/or visual works into said screening facility, said projection facility separate from said screening facility to reduce noise in said screening facility.

24. The media trailer of claim 23, wherein said projection facility is remotely controlled by said screening facility.

25. The media trailer of claim 17, further comprising:
   an information signal processing facility housed within said trailer shell, said information signal processing facility coupled to said editing facility; whereby
   signals representing recorded media can be edited by and stored upon said information signal processing facility, commands for such editing and storage initiated from said editing facility.

26. The media trailer of claim 18, wherein said trailer shell further comprises:
   a second slideout, said second slideout slidably engaging said trailer shell on a side of said trailer shell opposite that of said first slideout;
   said second slideout expanding enclosed space within the media trailer when said second slideout is extended from said trailer shell; and
   said second slideout generally conforming to an exterior of said trailer shell when said second slideout is withdrawn into said trailer shell; whereby
   expanded interior confines may be provided for the media trailer by said second slideout when said second slideout is deployed, said second slideout providing a more streamlined exterior for the media trailer when said second slideout is retracted.

27. The media trailer of claim 26, wherein said second slideout further comprises said editing facility.

28. The media trailer of claim 26, wherein said second slideout extends from and retracts into said screening facility.

29. The media trailer of claim 28, wherein said second slideout further comprises:
   an information signal processing facility housed within said trailer shell, said information signal processing facility coupled to said editing facility; whereby
   signals representing recorded media can be edited by and stored upon said information signal processing facility, commands for such editing and storage initiated from said editing facility.

30. The media trailer of claim 26, wherein said second slideout further comprises:
   a first part of said editing facility on a first side of said slideout;
   a second part of said editing facility on a second side of said slideout; and
   an information signal processing facility positioned between said first and second editing facility parts, said information signal processing facility coupled to said editing facility; whereby
   said second slideout provides additional room for said editing facility when said second slideout is extended and signals representing recorded media can be edited by and stored upon said information signal processing facility, commands for such editing and storage initiated from said editing facility.

31. The media trailer of claim 30, wherein said second slideout defines a passageway between said screening facility and a rear portion of the media trailer when said second slideout is extended.

32. A media trailer for editing and screening audio-visual and related media on location, the media trailer comprising:
   a trailer shell, said trailer shell providing an enclosed space for editing and screening activities;
   an editing facility housed within said trailer shell, said editing facility providing editing capability capable of editing audio-visual media, said editing facility including a KEM station and an information signal processing facility for processing, editing, and storing signals representing recorded media;
   a screening facility housed within said trailer shell, said screening facility providing screening capability capable of screening audio-visual media edited by said editing facility;
   a projection facility housed within said trailer shell, said projection facility transmitting audio and/or visual works into said screening facility, said projection facility separate from said screening facility to reduce noise in said screening facility, said projection facility remotely controllable from said screening facility;

a first slideout, said first slideout slidably engaging said trailer shell, said first slideout expanding enclosed space within the media trailer when said first slideout is extended from said trailer shell, said first slideout generally conforming to an exterior of said trailer shell when said first slideout is withdrawn into said trailer shell, said first slideout extending from and retracting into said screening facility, said first slideout including a commissary or refreshment area, said commissary area generally adjacent to a first part of said editing facility;

a second slideout, said second slideout slidably engaging said trailer shell on a side of said trailer shell opposite that of said first slideout, said second slideout expanding enclosed space within the media trailer when said second slideout is extended from said trailer shell, said second slideout generally conforming to an exterior of said trailer shell when said second slideout is withdrawn into said trailer shell, a second part of said editing facility on a first side of said slideout and a third part of said editing facility on a second side of said slideout, said information signal processing facility positioned between said second and third editing facility parts, second slideout defining a passageway between said screening facility and a rear portion of the media trailer when said second slideout is extended; and a communications facility for providing communications between said information signal processing facility and a receiver of information signals used by said information signal processing facility; whereby editing, screening, and communications capability are made available in a transportable form that can generally be moved into close proximity to locations where audio, visual, and/or audio-visual media are recorded, making production of such media more contemporaneous with the recording thereof.

33. A self-contained, portable, and transportable editing and screening facility for editing and screening audio-visual and related media on location, the facility comprising:

shell means for providing an enclosed space for editing and screening activities;

editing facility means housed within said shell means, said editing facility means for providing editing capability capable of editing audio-visual media; and screening facility means housed within said shell, said screening facility means for providing screening capability capable of screening audio-visual media edited by said editing facility means; whereby editing and screening of audio-visual media can be performed on location in conjunction with the generation and recording of such audio-visual media to enhance and optimize the realization of audio-visual media production in a more timely fashion.

* * * * *